United States Patent
Wang et al.

(10) Patent No.: US 11,514,712 B2
(45) Date of Patent: Nov. 29, 2022

(54) FINGERPRINT ENTRY METHOD AND APPARATUS, AND SYSTEM AND ELECTRONIC DEVICE

(71) Applicant: Hangzhou Hikvision Digital Technology Co., Ltd., Hangzhou (CN)

(72) Inventors: Hongshuai Wang, Hangzhou (CN); Lujie Si, Hangzhou (CN); Kui Li, Hangzhou (CN); Weichang Kang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 168 days.

(21) Appl. No.: 17/043,430

(22) PCT Filed: Jan. 29, 2019

(86) PCT No.: PCT/CN2019/073609
§ 371 (c)(1),
(2) Date: Sep. 29, 2020

(87) PCT Pub. No.: WO2019/192254
PCT Pub. Date: Oct. 10, 2019

(65) Prior Publication Data
US 2021/0019498 A1 Jan. 21, 2021

(30) Foreign Application Priority Data
Apr. 2, 2018 (CN) .......................... 201810283469.9

(51) Int. Cl.
*G06V 40/12* (2022.01)
*G06V 40/50* (2022.01)

(52) U.S. Cl.
CPC .......... *G06V 40/1365* (2022.01); *G06V 40/12* (2022.01); *G06V 40/50* (2022.01); *G06V 40/55* (2022.01)

(58) Field of Classification Search
CPC .... G06V 40/1365; G06V 40/12; G06V 40/50; G06V 10/94; G07C 1/10; G07C 9/00; G07C 9/00158; G06F 17/30247
See application file for complete search history.

(56) References Cited

U.S. PATENT DOCUMENTS

| 11,295,549 B1* | 4/2022 | Yadav | G06V 40/1365 |
| 2001/0053239 A1* | 12/2001 | Takhar | G07F 7/1008 |
| | | | 382/124 |
| 2005/0273865 A1* | 12/2005 | Slijp | H04N 1/4406 |
| | | | 726/28 |

FOREIGN PATENT DOCUMENTS

| CN | 1450494 | 10/2003 |
| CN | 101447692 | 6/2009 |

(Continued)

OTHER PUBLICATIONS

International Search Report and Written Opinion issued in Corresponding PCT Application No. PCT/CN2019/073609, dated Apr. 28, 2019 (English Translation provided).

(Continued)

*Primary Examiner* — John B Strege
(74) *Attorney, Agent, or Firm* — Norton Rose Fulbright US LLP

(57) ABSTRACT

A fingerprint input method, apparatus, system and an electronic device are provided. The method includes: obtaining a fingerprint as a current fingerprint (S101); comparing the current fingerprint with a fingerprint stored in a fingerprint database (S102); storing, when it is determined that there is no fingerprint identical with the current fingerprint in the fingerprint database, the current fingerprint in the fingerprint (Continued)

database. It can be seen that before storing the obtained current fingerprint into the fingerprint database, it is firstly determined whether there is a fingerprint identical with the current fingerprint in the fingerprint database, and when it is determined that there is no fingerprint identical with the current fingerprint in the fingerprint database, the current fingerprint is stored in the fingerprint database, to avoid the occurrence of duplicate fingerprints in the fingerprint database, avoid the input of the duplicate fingerprints, and improve the user experience.

20 Claims, 7 Drawing Sheets

(56) References Cited

FOREIGN PATENT DOCUMENTS

| CN | 101794390 | 8/2010 |
|----|-----------|--------|
| CN | 102629258 | 8/2012 |
| CN | 202372996 | 8/2012 |
| CN | 103186735 | 7/2013 |
| CN | 103473179 | 12/2013 |
| CN | 103886240 | 6/2014 |
| CN | 105180590 | 12/2015 |
| CN | 105260640 | 1/2016 |
| CN | 105654071 | 6/2016 |
| CN | 205845132 | 12/2016 |
| CN | 106650706 | 5/2017 |
| CN | 106899409 | 6/2017 |
| CN | 107516156 | 12/2017 |

OTHER PUBLICATIONS

Notification to Grant Patent Right for Invention issued in Corresponding Chinese Application No. 201810283469.9, dated Jun. 23, 2021 (English Translation provided).

Office Action issued in Corresponding Chinese Application No. 201810283469.9, dated Dec. 16, 2020 (English Translation provided).

* cited by examiner

FINGERPRINT ENTRY METHOD AND APPARATUS, AND SYSTEM AND ELECTRONIC DEVICE

CROSS REFERENCE TO RELATED APPLICATIONS

The present application is a national phase application under 35 U.S.C. § 371 of International Application No. PCT/CN2019/073609, filed Jan. 29, 2019, which claims the benefit of priority to Chinese patent application No. 201810283469.9 filed with the China National Intellectual Property Administration on Apr. 2, 2018 and entitled "fingerprint input method, apparatus, system and an electronic device", each of which are incorporated herein by reference in their entirety.

TECHNICAL FIELD

The present application relates to the technical field of fingerprint input, and in particular to a fingerprint input method, apparatus, system and an electronic device.

BACKGROUND

As a kind of personnel certificate, the fingerprint is very important in an access control system, and can be used as a valid certificate for door opening and attendance.

In an access control system, the fingerprint input process is very important. A related fingerprint input process is generally as follows: an access control platform maintenance personnel capture a fingerprint of each of persons one by one through a fingerprint module, store the captured fingerprints in a fingerprint database of the platform, and manually store a person ID (ID entity) of each person, in correspondence with the fingerprint of the person, in the fingerprint database of the platform. Wherein, the above fingerprint module is an equipment for scanning fingerprints of an identified person.

However, in the related fingerprint input process, due to the need to manually store a person ID (ID entity) of each person, in correspondence with the fingerprint of the person, in the fingerprint database of the platform, misoperation will be inevitable. For example, the situation that different person IDs correspond to the same fingerprint occurs, which in turn results in the situation of a wrong person using the fingerprint to open the door or record the attendance, and brings inconvenience to users of the access control system.

SUMMARY

The purpose of the embodiments of the present application is to provide a fingerprint input method, apparatus, system, and an electronic device, so as to avoid the input of duplicate fingerprints and improve the user experience. Specifically, the technical solutions are as follows.

In one aspect, an embodiment of the present application provides a fingerprint input method including:

obtaining a fingerprint as a current fingerprint;

comparing the current fingerprint with a fingerprint stored in a fingerprint database;

storing, when it is determined that there is no fingerprint identical with the current fingerprint in the fingerprint database, the current fingerprint in the fingerprint database.

Optionally, after the step of storing the current fingerprint in the fingerprint database, the method further includes:

obtaining a person identity corresponding to the current fingerprint as a current person identity;

storing the current person identity in correspondence with the current fingerprint in the fingerprint database.

Optionally, the fingerprint database further stores correspondences between fingerprints and person identities;

the method further includes:

determining, when it is determined that there is a fingerprint identical with the current fingerprint in the fingerprint database, a person identity corresponding to the fingerprint identical with the current fingerprint in the fingerprint database as a comparison person identity;

obtaining a person identity corresponding to the current fingerprint as a current person identity;

comparing the current person identity with the comparison person identity;

discarding, when it is determined that the current person identity is the same as the comparison person identity, the current person identity and the current fingerprint.

Optionally, each of the correspondences between the fingerprints and the person identities stored in the fingerprint database is a one-to-one relationship or a many-to-one relationship.

Optionally, the method is applied to a reader, and after the step of discarding the current person identity and the current fingerprint, the method further includes:

feeding back information, which indicates that the fingerprint is successfully stored, to a fingerprint input platform, so that the fingerprint input platform sends a next fingerprint for the current fingerprint to the reader.

Optionally, the method is applied to a reader, and the method further includes:

determining, when it is determined that the current person identity is different from the comparison person identity, that the current person identity and the comparison person identity correspond to the same fingerprint, and recording the current person identity and the comparison person identity.

Optionally, after the step of recording the current person identity and the comparison person identity, the method further includes:

sending the recorded current person identity and comparison person identity to a fingerprint input platform;

so that the fingerprint input platform outputs first prompt information containing the current person identity and the comparison person identity, to prompt a fingerprint input person to re-capture and -store a fingerprint corresponding to the current person identity and a fingerprint corresponding to the comparison person identity.

Optionally, the method is applied to a reader, and the step of obtaining a fingerprint as a current fingerprint includes:

obtaining a fingerprint sent by the fingerprint input platform as the current fingerprint.

Optionally, the method is applied to a fingerprint input platform, and after the step of discarding the current person identity and the current fingerprint, the method further includes:

outputting second prompt information to prompt a fingerprint input person that the current fingerprint and the current person identity are successfully stored.

Optionally, the method is applied to a fingerprint input platform, and the method further includes:

storing, when it is determined that the current person identity is different from the comparison person identity, the current fingerprint and the current person identity in the fingerprint database, and recording a correspondence between the current fingerprint and the current person identity;

determining the comparison person identity;

outputting third prompt information containing the comparison person identity, to prompt a fingerprint input person to re-input a fingerprint corresponding to the comparison person identity.

Optionally, after the step of outputting third prompt information containing the comparison person identity, the method further includes:

receiving the fingerprint, corresponding to the comparison person identity, captured by a fingerprint module;

replacing the locally stored fingerprint corresponding to the comparison person identity with the received fingerprint corresponding to the comparison person identity.

Optionally, after the step of storing the current fingerprint in the fingerprint database, the method further includes:

sending, when receiving a fingerprint issuing instruction, a fingerprint, corresponding to the fingerprint issuing instruction, stored in the fingerprint database to at least one reader corresponding to a control device through the control device, so that the at least one reader receives and stores the sent fingerprint corresponding to the fingerprint issuing instruction.

Optionally, the method is applied to a fingerprint input platform, the step of obtaining a fingerprint as a current fingerprint includes:

obtaining a fingerprint captured by a fingerprint module as the current fingerprint.

In another aspect, an embodiment of the present application provides a fingerprint input apparatus including:

a first obtaining module, configured for obtaining a fingerprint as a current fingerprint;

a first comparing module, configured for comparing the current fingerprint with a fingerprint stored in a fingerprint database;

a first storing module, configured for storing, when it is determined that there is no fingerprint identical with the current fingerprint in the fingerprint database, the current fingerprint in the fingerprint database.

Optionally, the apparatus further includes a second obtaining module and a second storing module;

the second obtaining module is configured for obtaining a person identity corresponding to the current fingerprint as a current person identity after storing the current fingerprint in the fingerprint database;

the second storing module is configured for storing the current person identity in correspondence with the current fingerprint in the fingerprint database.

Optionally, the fingerprint database further stores correspondences between fingerprints and person identities;

the apparatus further includes a first determining module, a third obtaining module, a second comparing module and a discarding module;

the first determining module is configured for determining, when it is determined that there is a fingerprint identical with the current fingerprint in the fingerprint database, a person identity corresponding to the fingerprint identical with the current fingerprint in the fingerprint database as a comparison person identity;

the third obtaining module is configured for obtaining a person identity corresponding to the current fingerprint as a current person identity;

the second comparing module is configured for comparing the current person identity with the comparison person identity;

the discarding module is configured for discarding, when it is determined that the current person identity is the same as the comparison person identity, the current person identity and the current fingerprint.

Optionally, each of the correspondences between the fingerprints and the person identities stored in the fingerprint database is a one-to-one relationship or a many-to-one relationship.

Optionally, the apparatus is applied to a reader and further includes a feedback module;

the feedback module is configured for feeding back information, which indicates that the fingerprint is successfully stored, to a fingerprint input platform after discarding the current person identity and the current fingerprint, so that the fingerprint input platform sends a next fingerprint for the current fingerprint to the reader.

Optionally, the apparatus is applied to a reader and further includes a determining and recording module;

the determining and recording module is configured for determining, when it is determined that the current person identity is different from the comparison person identity, that the current person identity and the comparison person identity correspond to the same fingerprint, and recording the current person identity and the comparison person identity.

Optionally, the apparatus further includes a first sending module;

the first sending module is configured for sending the recorded current person identity and comparison person identity to a fingerprint input platform after recording the current person identity and the comparison person identity;

so that the fingerprint input platform outputs first prompt information containing the current person identity and the comparison person identity, to prompt a fingerprint input person to re-capture and -store a fingerprint corresponding to the current person identity and a fingerprint corresponding to the comparison person identity.

Optionally, the apparatus is applied to a reader, and the first obtaining module is specifically configured for:

obtaining a fingerprint sent by the fingerprint input platform as the current fingerprint.

Optionally, the apparatus is applied to a fingerprint input platform and further includes a first outputting module;

the first outputting module is configured for outputting second prompt information after discarding the current person identity and the current fingerprint, to prompt a fingerprint input person that the current fingerprint and the current person identity are successfully stored.

Optionally, the apparatus is applied to a fingerprint input platform and further includes a third storing module, a second determining module and a second outputting module;

the third storing module is configured for storing, when it is determined that the current person identity is different from the comparison person identity, the current fingerprint and the current person identity in the fingerprint database, and recording a correspondence between the current fingerprint and the current person identity;

the second determining module is configured for determining the comparison person identity;

the second outputting module is configured for outputting third prompt information containing the comparison person identity, to prompt a fingerprint input person to re-input a fingerprint corresponding to the comparison person identity.

Optionally, the apparatus further includes a receiving module and a replacing module;

the receiving module is configured for receiving the fingerprint, corresponding to the comparison person identity, captured by a fingerprint module after outputting the third prompt information containing the comparison person identity;

the replacing module is configured for replacing the locally stored fingerprint corresponding to the comparison person identity with the received fingerprint corresponding to the comparison person identity.

Optionally, the apparatus further includes a second sending module;

the second sending module is configured for sending, when receiving a fingerprint issuing instruction, a fingerprint, corresponding to the fingerprint issuing instruction, stored in the fingerprint database to at least one reader corresponding to a control device through the control device after storing the current fingerprint in the fingerprint database, so that the at least one reader receives and stores the sent fingerprint corresponding to the fingerprint issuing instruction.

Optionally, the apparatus is applied to a fingerprint input platform, and the first obtaining module is specifically configured for:

obtaining a fingerprint captured by a fingerprint module as the current fingerprint.

In another aspect, an embodiment of the present application provides a fingerprint input system. The fingerprint input system includes: a fingerprint input platform, a control device and a reader; the fingerprint input platform is connected with a reader corresponding to a control device through the control device;

the fingerprint input platform is configured for obtaining a fingerprint captured by a fingerprint module as a current fingerprint; comparing the current fingerprint with a fingerprint stored in a fingerprint database; storing, when it is determined that there is no fingerprint identical with the current fingerprint in the fingerprint database, the current fingerprint in the fingerprint database; sending the fingerprint stored in the fingerprint database to the control device;

the control device is configured for receiving the fingerprint sent by the fingerprint input platform and sending the received fingerprint to the corresponding reader;

the reader is configured for receiving and storing the fingerprint sent by the corresponding control device.

In another aspect, an embodiment of the present application provides a fingerprint input system. The fingerprint input system includes: a fingerprint input platform, a control device and a reader; the fingerprint input platform is connected with a reader corresponding to a control device through the control device;

the fingerprint input platform is configured for obtaining and storing a fingerprint, and sending the stored fingerprint to the control device;

the control device is configured for receiving the fingerprint sent by the fingerprint input platform and sending the received fingerprint to the corresponding reader;

the reader is configured for using, each time receiving one fingerprint sent by the corresponding control device, the fingerprint as a current fingerprint; comparing the current fingerprint with a fingerprint stored in a fingerprint database; storing, when it is determined that there is no fingerprint identical with the current fingerprint in the fingerprint database, the current fingerprint in the fingerprint database.

In another aspect, an embodiment of the present application provides an electronic device including a processor, a communication interface, a memory and a communication bus, wherein the processor, the communication interface and the memory communicate with each other via the communication bus;

the communication interface is configured for communicating with external devices;

the memory is configured for storing a computer program;

the processor is configured for, when executing the computer program stored in the memory, implementing steps of any fingerprint input method provided by the embodiment of the present application.

In another aspect, an embodiment of the present application provides a computer readable storage medium, wherein the computer readable storage medium stores a computer program therein; the computer program, when executed by a processor, implements steps of any fingerprint input method provided by the embodiment of the present application.

In another aspect, an embodiment of the present application provides a computer program product, wherein the computer program product, when executed by a computer, causes the computer to perform steps of any fingerprint input method provided by the embodiment of the present application.

In the embodiments of the present application, a fingerprint is obtained as a current fingerprint; the current fingerprint is compared with a fingerprint stored in a fingerprint database; when it is determined that there is no fingerprint identical with the current fingerprint in the fingerprint database, the current fingerprint is stored in the fingerprint database. It can be seen that in the embodiment of the present application, before storing the obtained current fingerprint in the fingerprint database, it is firstly determined whether there is a fingerprint identical with the current fingerprint in the fingerprint database, and when it is determined that there is no fingerprint identical with the current fingerprint in the fingerprint database, the current fingerprint is stored in the fingerprint database, to avoid existence of duplicate fingerprints in the fingerprint database, avoid the input of the duplicate fingerprints, avoid occurrence of the situation that different person IDs correspond to the same fingerprint, and improve the user experience. Of course, any of the products or methods for implementing the embodiments of the present application is not necessarily required to achieve all of the advantages described above at the same time.

BRIEF DESCRIPTION OF THE DRAWINGS

In order to more clearly explain the technical solutions of embodiments of the present application or of related art, the drawings required in the description of the embodiments and of related art will be simplify introduced. Obviously, the drawings described below are only some of embodiments of the present application and other drawings may be obtained by those skilled in the art without any creative efforts based on these drawings.

DETAILED DESCRIPTION

Figure 1:
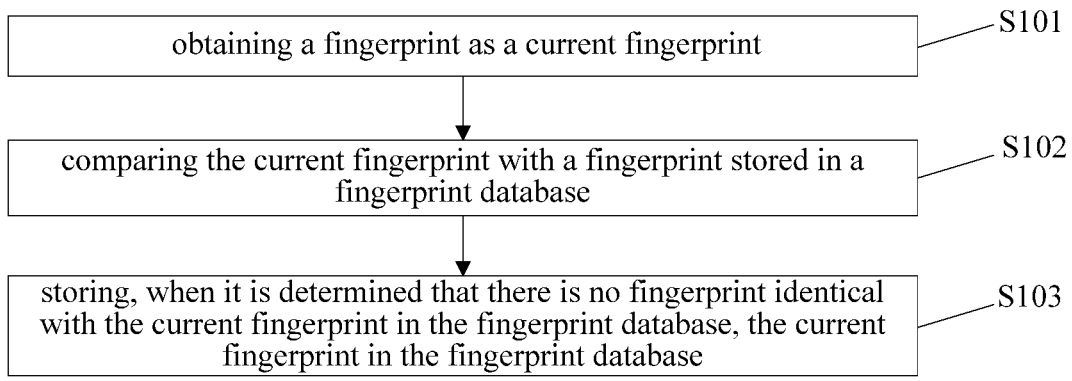
FIG. 1 is a schematic flow diagram of a fingerprint input method provided by an embodiment of the present application.

The technical solutions of the present application will be described clearly and completely with reference to the drawings of embodiments of the present application. Obviously, the embodiments described are only some instead of all of the embodiments of the present application. All other embodiments obtained by those skilled in the art based on the embodiments herein without any creative efforts are within the scope of protection of the present application.

The embodiments of the present application provides a fingerprint input method, apparatus, system, and an electronic device, so as to avoid the input of duplicate fingerprints and improve the user experience.

It can be understood that the fingerprint input method provided by the embodiment of the present application may be applied to any electronic device which may obtain and store a fingerprint in the fingerprint input system, the above electronic device may be a smart phone and a computer, etc. The above fingerprint input system may include a fingerprint input platform and a reader; in one implementation, the above fingerprint input system may further include a control device. In one situation, the above electronic device may be the above fingerprint input platform, that is, the fingerprint input method provided by the embodiment of the present application may be applied to the above fingerprint input platform; in another situation, the above electronic device may be the above reader, that is, the fingerprint input method provided by the embodiment of the present application may be applied to the above fingerprint input platform; both the situations are possible.

Wherein, the above reader is: a device that may realize the function of receiving and storing fingerprints issued by the fingerprint input platform, and capturing and identifying fingerprints and comparing the captured and identified fingerprints with the stored fingerprints. In one situation, if the fingerprint input system further includes a control device, and the fingerprint input system is combined with an access control system, the reader may further generate an instruction to open the door and/or record attendance and send the instruction to the control device in the case where it is determined that there is a fingerprint identical with the captured and identified fingerprint in the stored fingerprints, so that the control device connected to the reader may control the opening or closing of a door lock in the access control system, and/or record the attendance of persons. The fingerprint input platform may capture and store fingerprints through a fingerprint module, and issue the stored fingerprints to the reader corresponding to a control device through the control device.

In one implementation, if the above fingerprint input system includes a control device, the fingerprint input platform may be connected to at least one control device, and each control device may be connected to at least one reader. Wherein, the fingerprint input platform may capture and store fingerprints through a fingerprint module, and issue the stored fingerprints to the reader corresponding to a control device through the control device, so that the reader stores the received fingerprints. When the above fingerprint input method is applied to the fingerprint input platform, the fingerprint input platform may, each time after capturing a fingerprint through the fingerprint module, perform the fingerprint input method provided by the embodiment of the present application for the currently captured fingerprint, so as to avoid the storage of duplicate fingerprints, and then, after the fingerprint having been stored in the fingerprint input platform, the fingerprint input platform may issue the stored fingerprint to a reader corresponding to a control device through the control device. At this time, there are no duplicate fingerprints in fingerprints received by the reader.

When the above fingerprint input method is applied to a reader, the fingerprint input platform may store one fingerprint each time it captures one fingerprint through a fingerprint module, and subsequently, after the fingerprint input platform has stored all fingerprints required to be captured, the fingerprint input platform may issue the stored fingerprints to a reader corresponding to a control device through the control device. At this time, the reader performs the fingerprint input method provided by the embodiment of the present application to the currently received fingerprint each time it receives a fingerprint, to avoid the storage of duplicate fingerprints. Wherein, the above fingerprint module may be an equipment for scanning a fingerprint of an identified person.

As shown in FIG. 1, an embodiment of the present application provides a fingerprint input method, which may include the following steps:

S101: obtaining a fingerprint as a current fingerprint.

The electronic device may obtain the fingerprint and use the obtained fingerprint as the current fingerprint. In one situation, the above fingerprint may be a fingerprint sent by another device to the electronic device, and the another device may refer to a device other than the electronic device. For example, the electronic device is a reader in the fingerprint input system, and the fingerprint input system further includes a fingerprint input platform, the above fingerprint may be a fingerprint sent by the fingerprint input platform to the reader. In another situation, the above fingerprint may be a fingerprint captured and identified by the electronic device. For example, the electronic device is a fingerprint input platform in a fingerprint input system, the above fingerprint may be a fingerprint captured and identified by the fingerprint input platform through a fingerprint module.

S102: comparing the current fingerprint with a fingerprint stored in a fingerprint database.

In this step, the electronic device may store a fingerprint database, and the fingerprint database may store fingerprints; after obtaining a current fingerprint, the electronic device may compare the current fingerprint with the a fingerprint stored in the fingerprint database one by one, to determine whether there is a fingerprint identical with the current fingerprint in the fingerprint database, and then perform a subsequent fingerprint input process based on the determination result.

In one situation, when there is no fingerprint stored in the above fingerprint database, the current fingerprint may be directly stored in the fingerprint database.

S103: storing, when it is determined that there is no fingerprint identical with the current fingerprint in the fingerprint database, the current fingerprint in the fingerprint database.

In the embodiment of the present application, when the electronic device determines that there is no fingerprint identical with the current fingerprint in the fingerprint database, that is, there is no fingerprint duplicated with the current fingerprint, the current fingerprint is stored in the fingerprint database. In one situation, after the electronic device stores the current fingerprint in the fingerprint database, the electronic device may generate and output prompt information to prompt the fingerprint input person that the current fingerprint is successfully stored.

In the embodiment of the present application, a fingerprint is obtained as a current fingerprint; the current fingerprint is compared with a fingerprint stored in a fingerprint database; when it is determined that there is no fingerprint identical with the current fingerprint in the fingerprint database, the current fingerprint is stored in the fingerprint database. It can be seen that in the embodiment of the present application, before storing the obtained current fingerprint in the fingerprint database, it is firstly determined whether there is a fingerprint identical with the current fingerprint in the fingerprint database, and when it is determined that there is no fingerprint identical with the current fingerprint in the fingerprint database, the current fingerprint is stored in the fingerprint database, to avoid existence of duplicate fingerprints in the fingerprint database, avoid the input of the duplicate fingerprints, avoid occurrence of the situation that different person IDs correspond to the same fingerprint, and improve the user experience.

Figure 2:
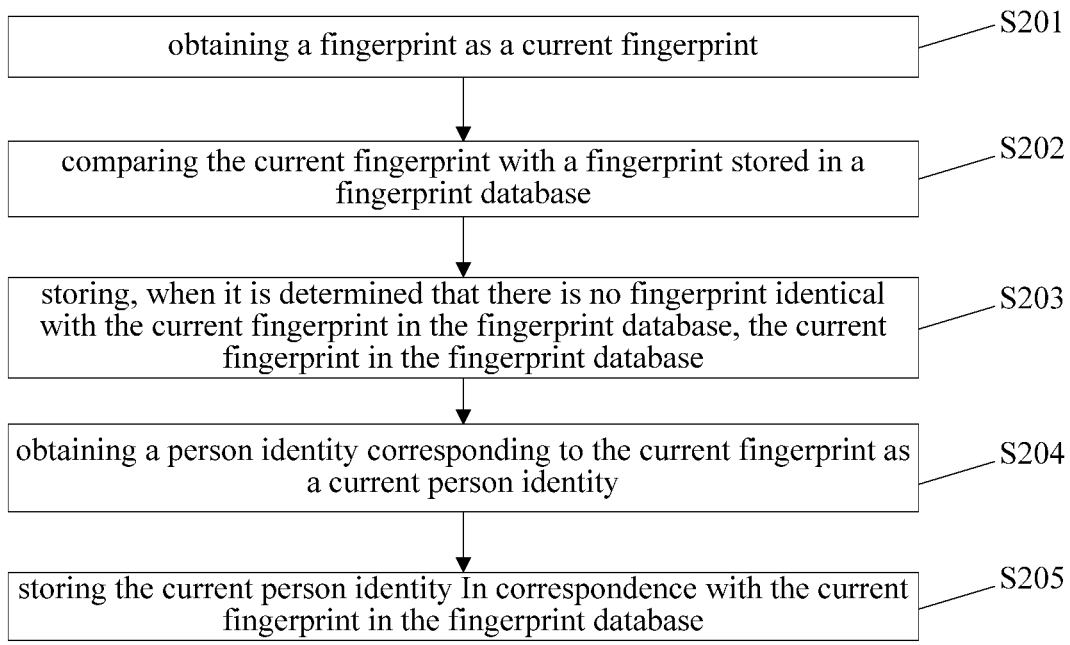
FIG. 2 is another schematic flow diagram of a fingerprint input method provided by an embodiment of the present application.

In one implementation, as shown in FIG. 2, a fingerprint input method provided by the embodiment of the present application may include the following steps:

S201: obtaining a fingerprint as a current fingerprint.

S202: comparing the current fingerprint with a fingerprint stored in a fingerprint database.

S203: storing, when it is determined that there is no fingerprint identical with the current fingerprint in the fingerprint database, the current fingerprint in the fingerprint database.

Wherein, S201 is the same as S101 shown in FIG. 1, S202 is the same as S102 shown in FIG. 1, and S203 is the same as S103 shown in FIG. 1.

S204: obtaining a person identity corresponding to the current fingerprint as a current person identity.

S205: storing the current person identity in correspondence with the current fingerprint in the fingerprint database.

In one implementation, the fingerprint of each person is unique, and the fingerprint is input to determine the corresponding person through the fingerprint. In the embodiment of the present application, when it is determined that there is no fingerprint identical with the current fingerprint in the fingerprint database, after storing the current fingerprint in the fingerprint database, the person identity (that is, the current person identity) corresponding to the current fingerprint may be obtained sequentially, and the current person identity is stored in correspondence with the current fingerprint in the fingerprint database. Wherein, the above process of storing the current person identity in correspondence with the current fingerprint in the fingerprint database may be as follows: storing the current person identity in the fingerprint database and storing the correspondence between the current person identity and the current fingerprint.

In one situation, when it is determined that there is no fingerprint identical with the current fingerprint in the fingerprint database, in order to better determine that the stored fingerprints will not have an error, it is also possible to compare the correspondence between the obtained current fingerprint and the current person identity with correspondences stored in the fingerprint database after obtaining the person identity corresponding to the current fingerprint (that is, the current person identity). When the comparison result indicates that the correspondence between the obtained current fingerprint and the current person identity does not exist in the fingerprint database, the correspondence between the obtained current fingerprint and the current person identity is stored in the fingerprint database.

Figure 3:
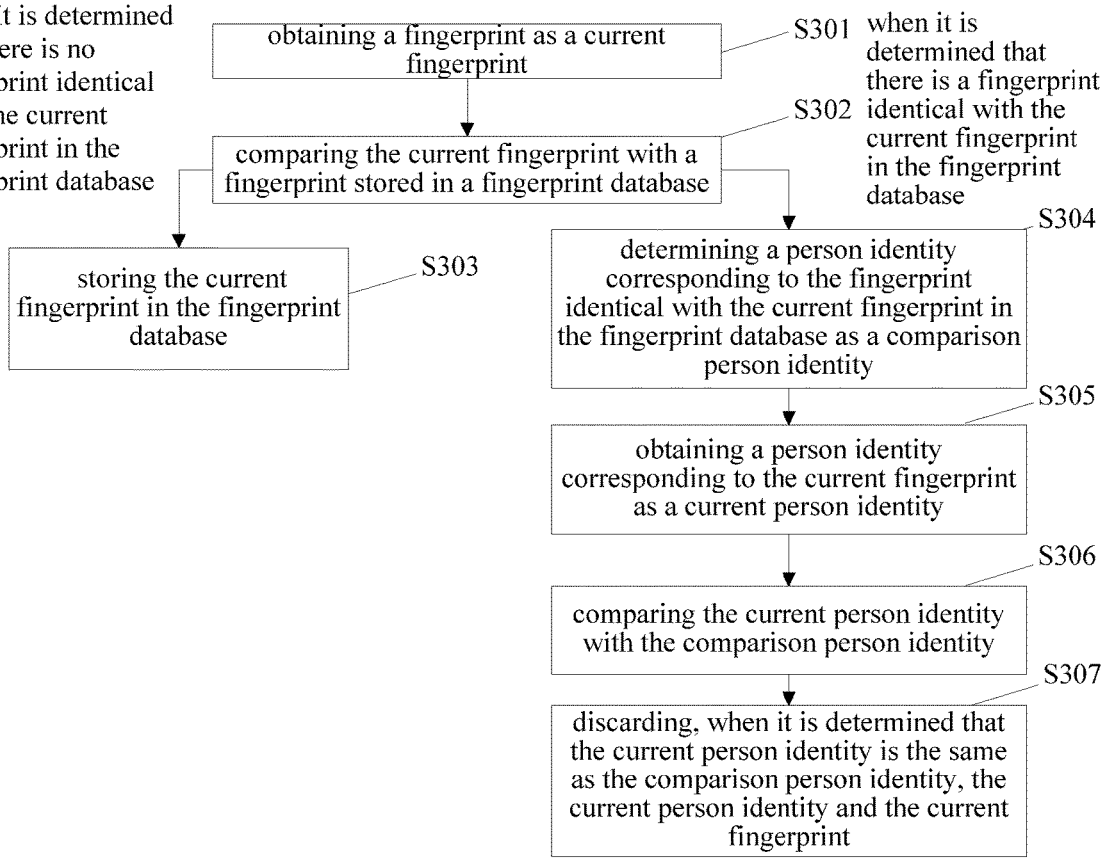
FIG. 3 is another schematic flow diagram of a fingerprint input method provided by an embodiment of the present application.

In one implementation, the fingerprint database may further store correspondences between fingerprints and person identities; as shown in FIG. 3, a fingerprint input method provided by the embodiment of the present application may include the following steps:

S301: obtaining a fingerprint as a current fingerprint.

S302: comparing the current fingerprint with a fingerprint stored in a fingerprint database; when it is determined that there is no fingerprint identical with the current fingerprint in the fingerprint database, performing S303; when it is determined that there is a fingerprint identical with the current fingerprint in the fingerprint database, performing S304.

S303: storing the current fingerprint in the fingerprint database.

Wherein, S301 is the same as S101 shown in FIG. 1, S302 is the same as S102 shown in FIG. 1, and S303 is the same as S103 shown in FIG. 1.

S304: determining a person identity corresponding to the fingerprint identical with the current fingerprint in the fingerprint database as a comparison person identity.

S305: obtaining a person identity corresponding to the current fingerprint as a current person identity.

S306: comparing the current person identity with the comparison person identity.

S307: discarding, when it is determined that the current person identity is the same as the comparison person identity, the current person identity and the current fingerprint.

In the embodiment of the present application, when the electronic device determines that there is a fingerprint identical with the current fingerprint, that is, there is a fingerprint duplicated with the current fingerprint, in the fingerprint database, the electronic device may sequentially obtain the person identity, that is, the current person identity, corresponding to the current fingerprint, and compare the current person identity with the person identity, that is, the comparison person identity, corresponding to the fingerprint identical with the current fingerprint in the fingerprint database. When it is determined that the current person identity is the same as the comparison person identity, it means that the fingerprint, that is, the current fingerprint, corresponding to the current person identity is repeatedly captured. At this time, in order to save the storage space of the fingerprint database, it is possible that there is no need to repeatedly store the above current fingerprint and current person identity, and the above current fingerprint and current person identity are discarded.

In one situation, after the electronic device discards the above current fingerprint and current person identity, the electronic device may further output information indicating that the current fingerprint and the current person identity are successfully stored, to prompt the fingerprint input person that the current fingerprint and the current person identity are successfully stored; or, the electronic device may output information that prompts the fingerprint input person that the above current fingerprint and the current person identity are duplicated and will not be stored repeatedly.

In one implementation, each of the correspondences between the fingerprints and the person identities stored in the fingerprint database is a one-to-one relationship or a many-to-one relationship. In one situation, in order to save the storage space of the fingerprint database, it may occur that each person identity corresponds to one fingerprint, that is, each person only inputs one fingerprint. In another situation, in order to avoid that the fingerprint of a person is not easy to be identified and read by a reader, one person may be allowed to input multiple fingerprints. For example, one person may be allowed to input fingerprints of any combination of an index finger, a middle finger, a thumb, a ring finger and a little finger, etc. At this time, the situation that one person identity corresponds to multiple fingerprints may occur.

That is to say, in another situation, due to physical differences of persons, it is inevitable that fingerprints are not easily identified and read. At this time, in order to ensure the accuracy of identifying and reading fingerprints of this category of persons, and then, in the access control system, in order to ensure the accuracy and convenience of recording attendances of this category of persons, and/or to ensure the accuracy and convenience of opening or closing the door lock, one person may be allowed to input multiple fingerprints, for example: one person may be allowed to input fingerprints of any combination of an index finger, a middle finger, a thumb, a ring finger and a little finger, etc. At this time, the situation that one person identity corresponds to multiple fingerprints may occur.

In one implementation, the fingerprint input method provided by the embodiment of the present application may be applied to a reader, and the reader may be set in a fingerprint input system. The fingerprint input system may further include a fingerprint input platform, and after the step of discarding the current person identity and the current fingerprint, the method may further include:

feeding back information, which indicates that the fingerprint is successfully stored, to a fingerprint input platform, so that the fingerprint input platform sends a next fingerprint for the current fingerprint to the reader.

In one situation, when the above electronic device is a reader, that is, when the fingerprint input method provided by the embodiment of the present application is applied to a reader, after discarding the current fingerprint and the current person identity, the reader may feed back information, which indicates that the fingerprint is successfully stored, to the fingerprint input platform, so that the above fingerprint input platform sends the next fingerprint for the current fingerprint to the reader. At this time, the reader receives the next fingerprint for the current fingerprint sent by the above fingerprint input platform as a new current fingerprint and performs the subsequent fingerprint input process.

In another situation, after storing the current fingerprint in the above fingerprint database, the reader may further feed back the information, which indicates that the fingerprint is successfully stored, to the fingerprint input platform, so that the fingerprint input platform sends the next fingerprint for the current fingerprint to the reader.

In one implementation, when the above electronic device is a reader, that is, when the fingerprint input method provided by the embodiment of the present application is applied to a reader, the method may further include:

determining, when it is determined that the current person identity is different from the comparison person identity, that the current person identity and the comparison person identity correspond to the same fingerprint, and recording the current person identity and the comparison person identity.

In the embodiment of the present application, when the reader determines that the current person identity is different from the comparison person identity, the reader may determine that the situation that different person identities correspond to the same fingerprint occurs, that is, the situation of duplicate fingerprints occurs. At this time, it can be determined that the fingerprint corresponding to the obtained current person identity is wrong, and/or the fingerprint corresponding to the obtained comparison person identity is wrong. The above reader will no longer store the above current fingerprint, and in order to be able to store the correct fingerprint corresponding to the above current person identity and the correct fingerprint corresponding to the above comparison person identity, the reader records the above current person identity and the comparison person identity.

In one situation, the above reader records the above current person identity and the comparison person identity, which may be used for subsequent review by the fingerprint input person, and re-captures the fingerprint of the person corresponding to the above current person identity and the fingerprint of the person corresponding to the comparison person identity, so that the reader may store the correct fingerprint corresponding to the current person identity and the correct fingerprint corresponding to the comparison person identity.

In another situation, after the step of recording the current person identity and the comparison person identity, the method may further include:

sending the recorded current person identity and comparison person identity to a fingerprint input platform;

so that the fingerprint input platform outputs first prompt information containing the current person identity and the comparison person identity, to prompt a fingerprint input person to re-capture and store the fingerprint corresponding to the current person identity and the fingerprint corresponding to the comparison person identity.

It is understandable that the reader may send the above current person identity and the comparison person identity to the fingerprint input platform after the reader records the above current person identity and the comparison person identity. In one situation, the above fingerprint input platform may immediately output first prompt information after the fingerprint input platform receives the above current person identity and the comparison person identity fed back by the reader, to prompt a fingerprint input person to re-capture and store the fingerprint corresponding to the current person identity and the fingerprint corresponding to the comparison person identity.

In another situation, after receiving the above current person identity and the comparison person identity fed back by the reader, the above fingerprint input platform may output the first prompt information after determining that all fingerprints in current fingerprint issuing operation are issued completely, to prompt a fingerprint input person to re-capture and store the fingerprint corresponding to the current person identity and the fingerprint corresponding to the comparison person identity. At this time, the above first prompt information may include: all person identities, corresponding to the duplicate fingerprints, fed back by the reader. For example, when the fingerprint input platform needs to issue ten fingerprints to the reader, determining that all fingerprints in current fingerprint issuing operation are issued completely may be: completely issuing ten fingerprints required to be issued to the reader.

In one implementation, when the above electronic device is a reader, that is, when the fingerprint input method provided by the embodiment of the present application is applied to a reader, the step of obtaining a fingerprint as a current fingerprint may include:

obtaining the fingerprint sent by the fingerprint input platform as the current fingerprint.

It can be understood that when the fingerprint input method provided by the embodiment of the present application is applied to a reader, the above reader may receive and store fingerprints sent by the fingerprint input platform; each time the above reader receives one fingerprint sent by the fingerprint input platform, the above reader uses the received fingerprint as the current fingerprint, and performs the subsequent fingerprint input process.

In one implementation, when the above electronic device is a fingerprint input platform, that is, when the fingerprint input method provided by the embodiment of the present application is applied to a fingerprint input platform, after the above step of discarding the current person identity and the current fingerprint, the method may further include:

outputting second prompt information to prompt the fingerprint input person that the current fingerprint and the current person identity are successfully stored.

When the fingerprint input method provided by the embodiment of the present application is applied to a fingerprint input platform, the second prompt information may be output after discarding the current person identity and the current fingerprint, to prompt the fingerprint input person that the current fingerprint and the current person identity are successfully stored, and at the same time, the information for prompting that the current fingerprint of the above fingerprint input person has been repeatedly captured, and the above current fingerprint and the current person identity will not be repeatedly stored may be further output. At this time, the above fingerprint input person may continue to input a fingerprint and a person identity of another person, so that the fingerprint input platform may continue to capture the fingerprint and the person identity of the another person.

In one implementation, when the above electronic device is a fingerprint input platform, that is, when the fingerprint input method provided by the embodiment of the present application is applied to the fingerprint input platform, the method may further include:

storing, when it is determined that the current person identity is different from the comparison person identity, the current fingerprint and the current person identity in the fingerprint database, and recording a correspondence between the current fingerprint and the current person identity;

determining the comparison person identity;

outputting third prompt information containing the comparison person identity, to prompt a fingerprint input person to re-input the fingerprint corresponding to the comparison person identity.

In one situation, when the fingerprint input method provided by the embodiment of the present application is applied to the fingerprint input platform, the fingerprint input platform may, for each fingerprint currently captured, determine whether there is a fingerprint identical with the currently captured fingerprint. When the fingerprint input platform determines that there is a fingerprint identical with the current fingerprint in the fingerprint database, and determines that the current person identity is different from the person identity (that is, the comparison person identity) corresponding to the fingerprint identical with the current fingerprint in the fingerprint database, the fingerprint input platform may directly store the current fingerprint and the current person identity in the fingerprint database, record a correspondence between the current fingerprint and the current person identity, then determine the comparison person identity, and output the third prompt information containing the comparison person identity, to prompt the fingerprint input person to re-input the fingerprint corresponding to the comparison person identity. In one situation, the above fingerprint input platform may directly delete the comparison person identity and the fingerprint corresponding to the comparison person identity stored in the fingerprint database.

It can be understood that, in one implementation, the output timing of outputting the third prompt information containing the comparison person identity may be: outputting immediately after the comparison person identity is determined; or, outputting after the fingerprint captured by the fingerprint module is not obtained within a predetermined period of time; or, outputting when a third prompt information output instruction manually triggered by the user is received.

In one implementation, after the step of outputting third prompt information containing the comparison person identity, the method may further include:

receiving the fingerprint, corresponding to the comparison person identity, captured by a fingerprint module;

replacing the locally stored fingerprint corresponding to the comparison person identity with the received fingerprint corresponding to the comparison person identity.

Wherein, after the fingerprint input platform outputs the third prompt information, a fingerprint capture person may re-convene a person corresponding to the comparison person identity to re-capture the fingerprint of the person. The fingerprint input platform receives the fingerprint corresponding to the comparison person identity captured by the fingerprint module. At this time, in one situation, the locally stored fingerprint corresponding to the comparison person identity may be directly replaced with the received fingerprint corresponding to the comparison person identity. In another situation, the captured fingerprint corresponding to the comparison person identity is used as a current fingerprint, and the current fingerprint is compared with a fingerprint stored in the fingerprint database; when it is determined that there is no fingerprint identical with the current fingerprint in the fingerprint database, the locally stored fingerprint corresponding to the comparison person identity is replaced with the received fingerprint corresponding to the comparison person identity.

In one implementation, after the step of storing the current fingerprint in the fingerprint database, the method may further include:

sending, when receiving a fingerprint issuing instruction, a fingerprint, corresponding to the fingerprint issuing instruction, stored in the fingerprint database to at least one reader corresponding to a control device through the control device, so that the at least one reader receives and stores the sent fingerprint corresponding to the fingerprint issuing instruction.

In one situation, when the fingerprint input method provided by the embodiment of the present application is applied to a fingerprint input platform, the fingerprint input platform issues the stored fingerprints to the reader, so that the reader receives and stores the fingerprint issued by the fingerprint input platform and performs corresponding operations based on the stored fingerprints. For example, it is determined whether there is a fingerprint identical with the fingerprint currently captured and identified in the stored fingerprints. When it is determined that there is a fingerprint identical with the fingerprint currently captured and identified in the stored fingerprints, a person identity corresponding to the fingerprint identical with the fingerprint currently captured and identified is determined, and the person identity is sent to a control device. After the control device receives the person identity, the control device records an attendance record of the person identity, and/or controls the opening of the door lock.

The fingerprint input platform may issue, when receiving the fingerprint issuing instruction, a fingerprint based on the fingerprint issuing instruction. Wherein, the above fingerprint issuing instruction may contain the fingerprint required to be issued, and/or the person identity corresponding to the fingerprint required to be issued.

In one implementation, when the above electronic device is a fingerprint input platform, that is, when the fingerprint input method provided by the embodiment of the present application is applied to a fingerprint input platform, the step of obtaining a fingerprint as a current fingerprint may include:

obtaining a fingerprint captured by a fingerprint module as the current fingerprint.

It can be understood that when the fingerprint input method provided by the embodiment of the present application is applied to a fingerprint input platform, the above fingerprint input platform may capture fingerprints through a fingerprint module, and each time the above fingerprint input platform captures one fingerprint, the fingerprint input platform uses the captured fingerprint as the current fingerprint, and performs the subsequent fingerprint input process.

Figure 4:
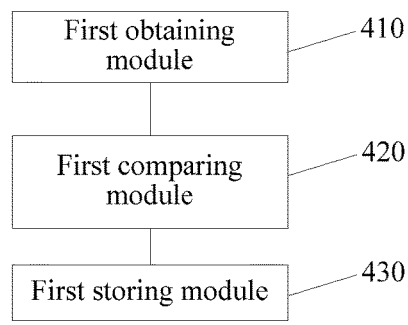
FIG. 4 is a schematic structural diagram of a fingerprint input apparatus provided by an embodiment of the present application.

Corresponding to the above embodiment of the method, an embodiment of the present application provides a fingerprint input apparatus, as shown in FIG. 4, that includes:

a first obtaining module 410, configured for obtaining a fingerprint as a current fingerprint;

a first comparing module 420, configured for comparing the current fingerprint with a fingerprint stored in a fingerprint database;

a first storing module 430, configured for storing, when it is determined that there is no fingerprint identical with the current fingerprint in the fingerprint database, the current fingerprint in the fingerprint database.

In the embodiment of the present application, a fingerprint is obtained as a current fingerprint; the current fingerprint is compared with a fingerprint stored in a fingerprint database; when it is determined that there is no fingerprint identical with the current fingerprint in the fingerprint database, the current fingerprint is stored in the fingerprint database. It can be seen that in the embodiment of the present application, before storing the obtained current fingerprint in the fingerprint database, it is firstly determined whether there is a fingerprint identical with the current fingerprint in the fingerprint database, and when it is determined that there is no fingerprint identical with the current fingerprint in the fingerprint database, the current fingerprint is stored in the fingerprint database, to avoid existence of duplicate fingerprints in the fingerprint database, avoid the input of the duplicate fingerprints, avoid occurrence of the situation that different person IDs correspond to the same fingerprint, and improve the user experience.

Figure 5:
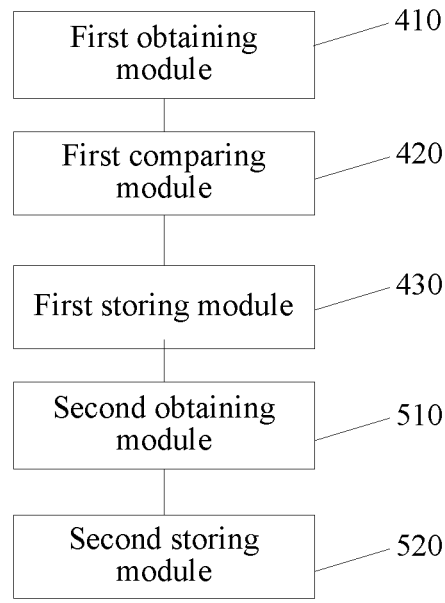
FIG. 5 is another schematic structural diagram of a fingerprint input apparatus provided by an embodiment of the present application.

In one implementation, as shown in FIG. 5, the apparatus further includes a second obtaining module 510 and a second storing module 520;

the second obtaining module 510 is configured for obtaining a person identity corresponding to the current fingerprint as a current person identity after storing the current fingerprint in the fingerprint database;

the second storing module 520 is configured for storing the current person identity in correspondence with the current fingerprint in the fingerprint database.

Figure 6:
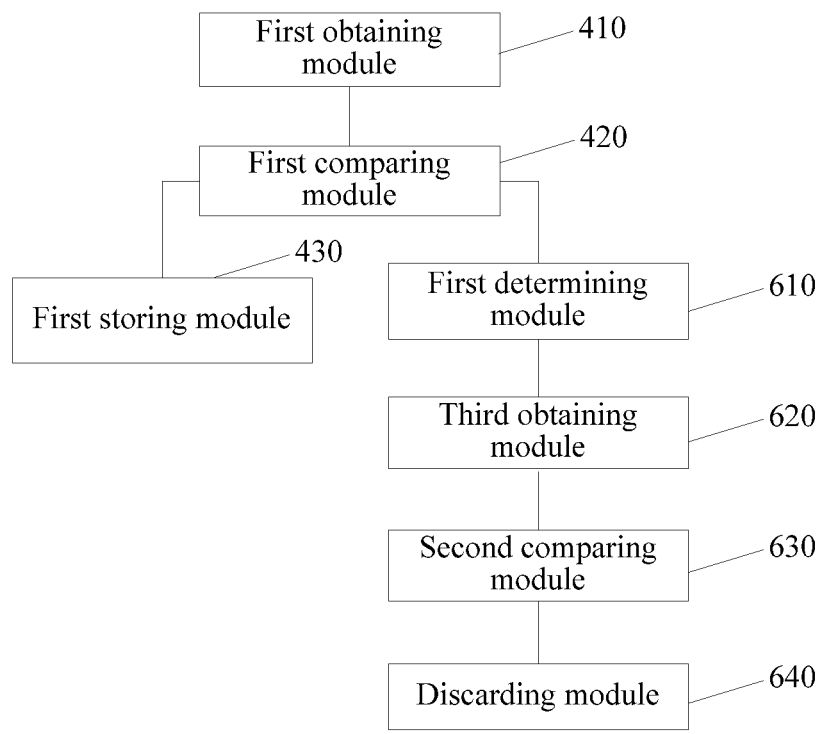
FIG. 6 is another schematic structural diagram of a fingerprint input apparatus provided by an embodiment of the present application.

In one implementation, the fingerprint database further stores correspondences between fingerprints and person identities, as shown in FIG. 6.

The apparatus further includes a first determining module 610, a third obtaining module 620, a second comparing module 630 and a discarding module 640;

the first determining module 610 is configured for determining, when it is determined that there is a fingerprint identical with the current fingerprint in the fingerprint database, a person identity corresponding to the fingerprint identical with the current fingerprint in the fingerprint database as a comparison person identity;

the third obtaining module 620 is configured for obtaining a person identity corresponding to the current fingerprint as a current person identity;

the second comparing module 630 is configured for comparing the current person identity with the comparison person identity;

the discarding module 640 is configured for discarding, when it is determined that the current person identity is the same as the comparison person identity, the current person identity and the current fingerprint.

In one implementation, each of the correspondences between the fingerprints and the person identities stored in the fingerprint database is a one-to-one relationship or a many-to-one relationship.

In one implementation, the apparatus is applied to a reader, and the apparatus further includes a feedback module;

the feedback module is configured for feeding back information, which indicates that the fingerprint is successfully stored, to a fingerprint input platform after discarding the current person identity and the current fingerprint, so that the fingerprint input platform sends a next fingerprint for the current fingerprint to the reader.

In one implementation, the apparatus is applied to a reader, and the apparatus further includes a determining and recording module;

the determining and recording module is configured for determining, when it is determined that the current person identity is different from the comparison person identity, that the current person identity and the comparison person identity correspond to the same fingerprint, and recording the current person identity and the comparison person identity.

In one implementation, the apparatus further includes a first sending module;

the first sending module is configured for sending the recorded current person identity and comparison person identity to a fingerprint input platform after recording the current person identity and the comparison person identity;

so that the fingerprint input platform outputs first prompt information containing the current person identity and the comparison person identity, to prompt a fingerprint input person to re-capture and store a fingerprint corresponding to the current person identity and a fingerprint corresponding to the comparison person identity.

In one implementation, the apparatus is applied to a reader, and the first obtaining module is specifically configured for:

obtaining a fingerprint sent by the fingerprint input platform as the current fingerprint.

In one implementation, the apparatus is applied to a fingerprint input platform, and the apparatus further includes a first outputting module;

the first outputting module is configured for outputting second prompt information after discarding the current person identity and the current fingerprint, to prompt a fingerprint input person that the current fingerprint and the current person identity are successfully stored.

In one implementation, the apparatus is applied to a fingerprint input platform, and the apparatus further includes a third storing module, a second determining module and a second outputting module;

the third storing module is configured for storing, when it is determined that the current person identity is different from the comparison person identity, the current fingerprint and the current person identity in the fingerprint database, and recording a correspondence between the current fingerprint and the current person identity;

the second determining module is configured for determining the comparison person identity;

the second outputting module is configured for outputting third prompt information containing the comparison person identity, to prompt a fingerprint input person to re-input a fingerprint corresponding to the comparison person identity.

In one implementation, the apparatus further includes a receiving module and a replacing module;

the receiving module is configured for receiving the fingerprint, corresponding to the comparison person identity, captured by a fingerprint module after outputting the third prompt information containing the comparison person identity;

the replacing module is configured for replacing the locally stored fingerprint corresponding to the comparison person identity with the received fingerprint corresponding to the comparison person identity.

In one implementation, the apparatus further includes a second sending module;

the second sending module is configured for sending, when receiving a fingerprint issuing instruction, a fingerprint, corresponding to the fingerprint issuing instruction, stored in the fingerprint database to at least one reader corresponding to a control device through the control device after storing the current fingerprint in the fingerprint database, so that the at least one reader receives and stores the sent fingerprint corresponding to the fingerprint issuing instruction.

In one implementation, the apparatus is applied to a fingerprint input platform, and the first obtaining module is specifically configured for:

obtaining a fingerprint captured by a fingerprint module as the current fingerprint.

Figure 7:
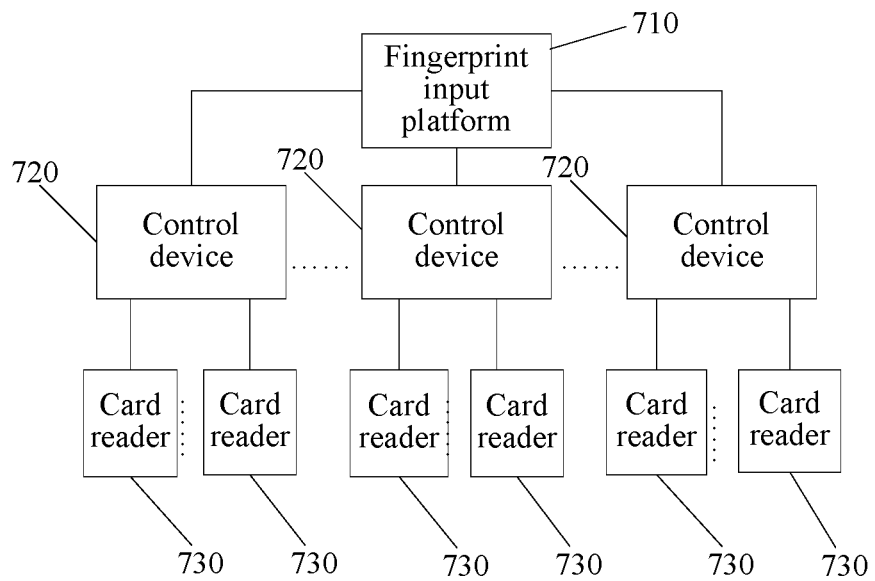
FIG. 7 is a schematic structural diagram of a fingerprint input system provided by an embodiment of the present application.

Corresponding to the above embodiment of the method, an embodiment of the present application further provides a fingerprint input system, as shown in FIG. 7. The fingerprint input system includes: a fingerprint input platform 710, control devices 720 and readers 730; the fingerprint input platform 710 is connected with a reader 730 corresponding to a control device 720 through the control device 720;

the fingerprint input platform 710 is configured for obtaining a fingerprint captured by a fingerprint module as a current fingerprint; comparing the current fingerprint with a fingerprint stored in a fingerprint database; storing, when it is determined that there is no fingerprint identical with the current fingerprint in the fingerprint database, the current fingerprint in the fingerprint database; sending the fingerprint stored in the fingerprint database to the control device 720;

the control device 720 is configured for receiving the fingerprint sent by the fingerprint input platform 710 and sending the received fingerprint to the corresponding reader 730;

the reader 730 is configured for receiving and storing the fingerprint sent by the corresponding control device.

In the embodiment of the present application, a fingerprint is obtained as a current fingerprint; the current fingerprint is compared with a fingerprint stored in a fingerprint database; when it is determined that there is no fingerprint identical with the current fingerprint in the fingerprint database, the current fingerprint is stored in the fingerprint database. It can be seen that in the embodiment of the present application, before storing the obtained current fingerprint in the fingerprint database, it is firstly determined whether there is a fingerprint identical with the current fingerprint in the fingerprint database, and when it is determined that there is no fingerprint identical with the current fingerprint in the fingerprint database, the current fingerprint is stored in the fingerprint database, to avoid existence of duplicate fingerprints in the fingerprint database, avoid the input of the duplicate fingerprints, avoid occurrence of the situation that different person IDs correspond to the same fingerprint, and improve the user experience.

In one implementation, the fingerprint input platform 710 is further configured for obtaining, after storing the current fingerprint in the fingerprint database, a person identity corresponding to the current fingerprint as a current person identity, and storing the current person identity in correspondence with the current fingerprint in the fingerprint database.

In one implementation, the fingerprint database further stores correspondences between fingerprints and person identities;

the fingerprint input platform 710 is further configured for: determining, when it is determined that there is a fingerprint identical with the current fingerprint in the fingerprint database, a person identity corresponding to the fingerprint identical with the current fingerprint in the fingerprint database as a comparison person identity;

obtaining a person identity corresponding to the current fingerprint as a current person identity;

comparing the current person identity with the comparison person identity;

discarding, when it is determined that the current person identity is the same as the comparison person identity, the current person identity and the current fingerprint.

In one implementation, each of the correspondences between the fingerprints and the person identities stored in the fingerprint database is a one-to-one relationship or a many-to-one relationship.

In one implementation, the fingerprint input platform 710 is further configured for: storing, when it is determined that the current person identity is different from the comparison person identity, the current fingerprint and the current person identity in the fingerprint database, and recording a correspondence between the current fingerprint and the current person identity;

determining the comparison person identity;

outputting third prompt information containing the comparison person identity, to prompt a fingerprint input person to re-input a fingerprint corresponding to the comparison person identity.

In one implementation, the fingerprint input platform 710 is further configured for: receiving the fingerprint, corresponding to the comparison person identity, captured by a fingerprint module after outputting the third prompt information containing the comparison person identity;

replacing the locally stored fingerprint corresponding to the comparison person identity with the received fingerprint corresponding to the comparison person identity.

In one implementation, the fingerprint input platform 710 is further configured for sending, when receiving a fingerprint issuing instruction, a fingerprint, corresponding to the fingerprint issuing instruction, stored in the fingerprint database to at least one reader corresponding to a control device through the control device after storing the current fingerprint in the fingerprint database, so that the at least one reader receives and stores the sent fingerprint corresponding to the fingerprint issuing instruction.

In one implementation, the fingerprint input platform 710 is specifically configured for obtaining a fingerprint captured by a fingerprint module as the current fingerprint.

Figure 8:
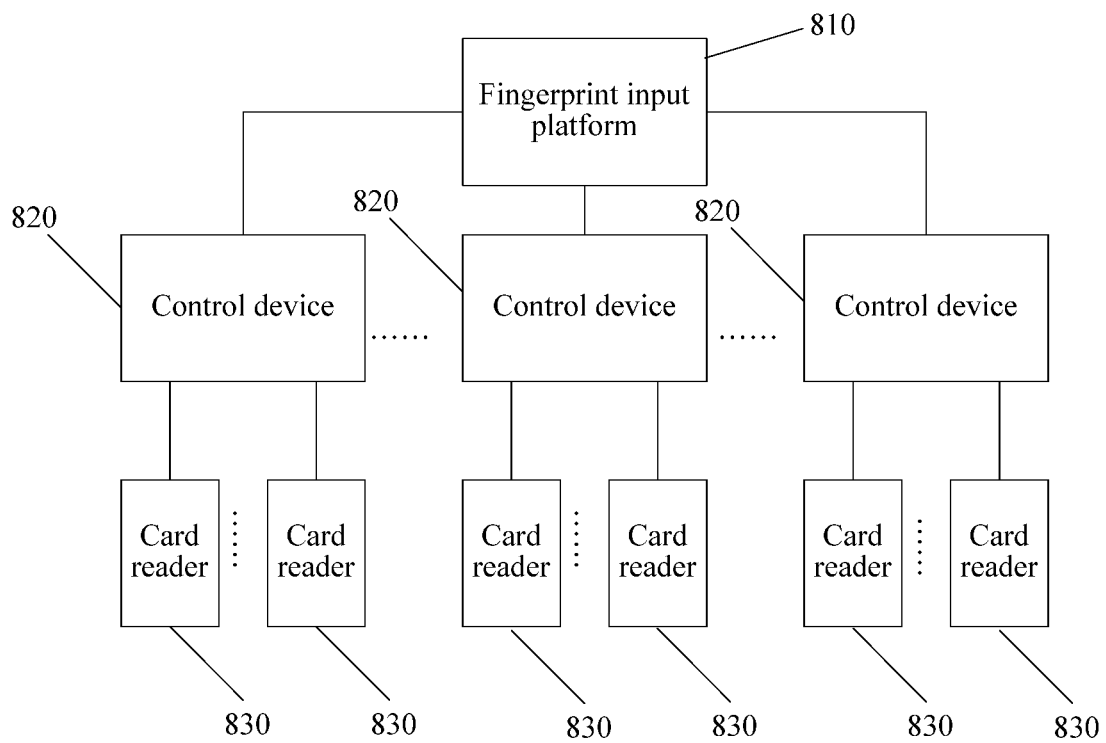
FIG. 8 is another schematic structural diagram of a fingerprint input system provided by an embodiment of the present application.

Corresponding to the above embodiment of the method, an embodiment of the present application further provides a fingerprint input system 800, as shown in FIG. 8. The fingerprint input system 800 includes: a fingerprint input platform 810, control devices 820 and readers 830; the fingerprint input platform 810 is connected with a reader 830 corresponding to a control device 820 through the control device;

the fingerprint input platform 810 is configured for obtaining and storing a fingerprint, and sending the stored fingerprint to the control device 820;

the control device 820 is configured for receiving the fingerprint sent by the fingerprint input platform 810 and sending the received fingerprint to the corresponding reader 830;

the reader 830 is configured for using, each time receiving one fingerprint sent by the corresponding control device 820, the fingerprint as a current fingerprint; comparing the current fingerprint with a fingerprint stored in a fingerprint database; storing, when it is determined that there is no fingerprint identical with the current fingerprint in the fingerprint database, the current fingerprint in the fingerprint database.

In the embodiment of the present application, a fingerprint is obtained as a current fingerprint; the current fingerprint is compared with a fingerprint stored in a fingerprint database; when it is determined that there is no fingerprint identical with the current fingerprint in the fingerprint database, the current fingerprint is stored in the fingerprint database. It can be seen that in the embodiment of the present application, before storing the obtained current fingerprint in the fingerprint database, it is firstly determined whether there is a fingerprint identical with the current fingerprint in the fingerprint database, and when it is determined that there is no fingerprint identical with the current fingerprint in the fingerprint database, the current fingerprint is stored in the fingerprint database, to avoid existence of duplicate fingerprints in the fingerprint database, avoid the input of the duplicate fingerprints, avoid occurrence of the situation that different person IDs correspond to the same fingerprint, and improve the user experience.

In one implementation, the fingerprint input platform 810 is further configured for obtaining and storing a person identity corresponding to each fingerprint, and sending the stored person identity corresponding to each fingerprint to the control device;

the control device 820 is further configured for receiving the person identity, corresponding to each fingerprint, sent by the fingerprint input platform and sending the received person identity, corresponding to each fingerprint, to the corresponding reader;

the reader 830 is further configured for obtaining, after storing the current fingerprint in the fingerprint database, a person identity corresponding to the current fingerprint as a current person identity, and storing the current person identity in correspondence with the current fingerprint in the fingerprint database.

In one implementation, the fingerprint database further stores correspondences between fingerprints and person identities;

the reader 830 is further configured for: determining, when it is determined that there is a fingerprint identical with the current fingerprint in the fingerprint database, a person identity corresponding to the fingerprint identical with the current fingerprint in the fingerprint database as a comparison person identity;

obtaining a person identity corresponding to the current fingerprint as a current person identity;

comparing the current person identity with the comparison person identity;

discarding, when it is determined that the current person identity is the same as the comparison person identity, the current person identity and the current fingerprint.

In one implementation, each of the correspondences between the fingerprints and the person identities stored in the fingerprint database is a one-to-one relationship or a many-to-one relationship.

In one implementation, the reader 830 is further configured for feeding back information, which indicates that the fingerprint is successfully stored, to a fingerprint input platform after discarding the current person identity and the current fingerprint, so that the fingerprint input platform sends a next fingerprint for the current fingerprint to the reader.

In one implementation, the reader 830 is further configured for determining, when it is determined that the current person identity is different from the comparison person identity, that the current person identity and the comparison person identity correspond to the same fingerprint, and recording the current person identity and the comparison person identity.

In one implementation, the reader 830 is further configured for sending the recorded current person identity and comparison person identity to a fingerprint input platform after recording the current person identity and the comparison person identity;

so that the fingerprint input platform outputs first prompt information containing the current person identity and the comparison person identity, to prompt a fingerprint input person to re-capture and store a fingerprint corresponding to the current person identity and a fingerprint corresponding to the comparison person identity.

In one implementation, the reader 830 is specifically configured for obtaining a fingerprint sent by the fingerprint input platform as the current fingerprint.

Figure 9:
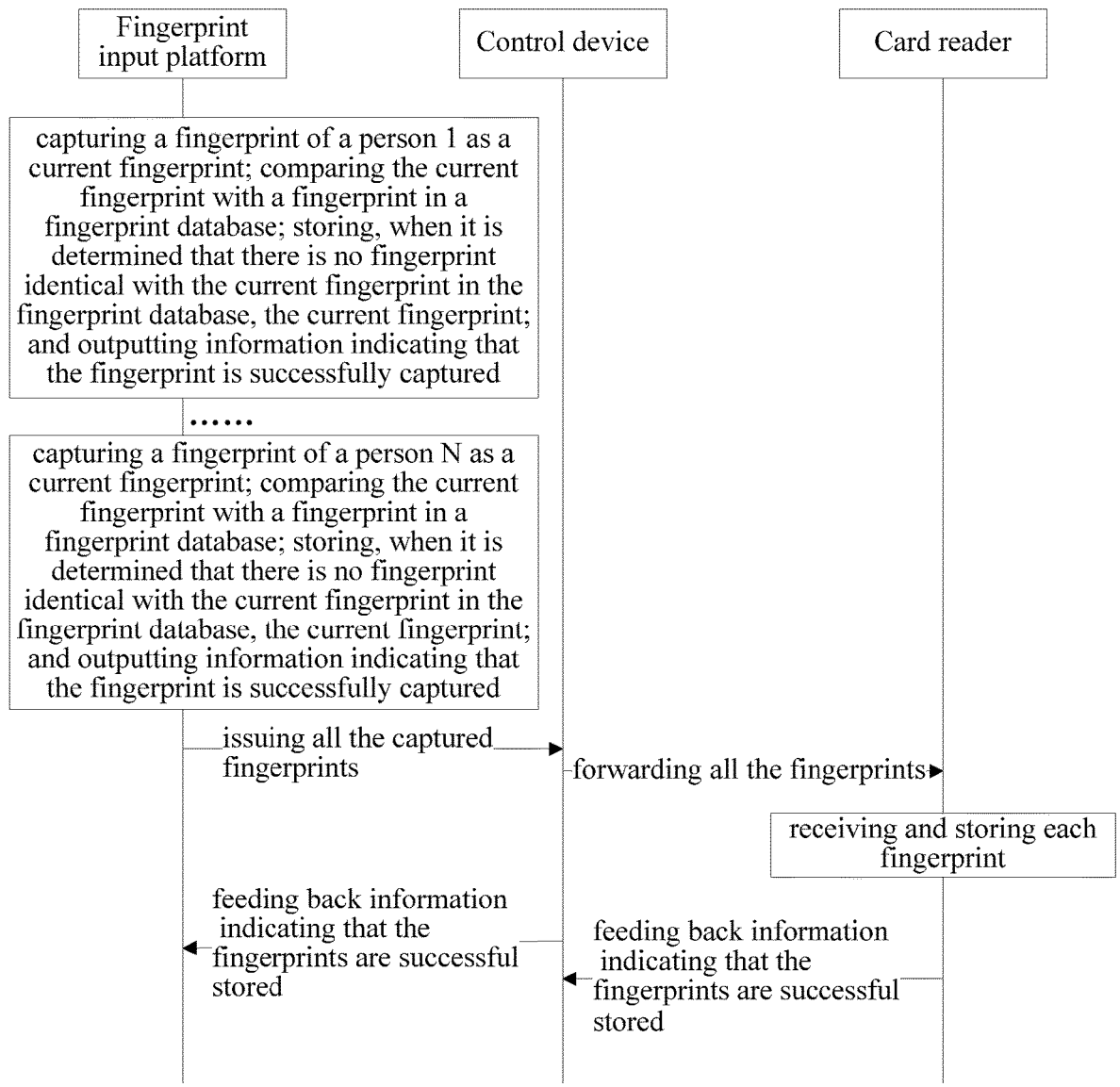
FIG. 9 is a schematic flow diagram of a fingerprint input system shown in FIG. 7.

In one situation, when the fingerprint input method provided by the embodiment of the present application is applied to a fingerprint input platform in a fingerprint input system, as shown in FIG. 9, the fingerprint input platform captures one fingerprint of one person each time as a current fingerprint, compares the current fingerprint with a fingerprint stored in a fingerprint database, stores, when it is determined that there is no fingerprint identical with the current fingerprint in the fingerprint database, the current fingerprint in the fingerprint database and informs a fingerprint capture person that the current fingerprint is successfully captured; after the fingerprint input platform successfully captures fingerprints of all persons whose fingerprints need to be captured, the fingerprint input platform issues the fingerprints stored in the fingerprint database to a reader corresponding to a control device through the control device; the reader receives and stores each of fingerprints, and after all the fingerprints are received and stored completely, the reader feeds back information, which indicates that the fingerprints are successfully stored, to the fingerprint input platform through the control device. Wherein, "N" shown in FIG. 9 is a positive integer.

Figure 10:
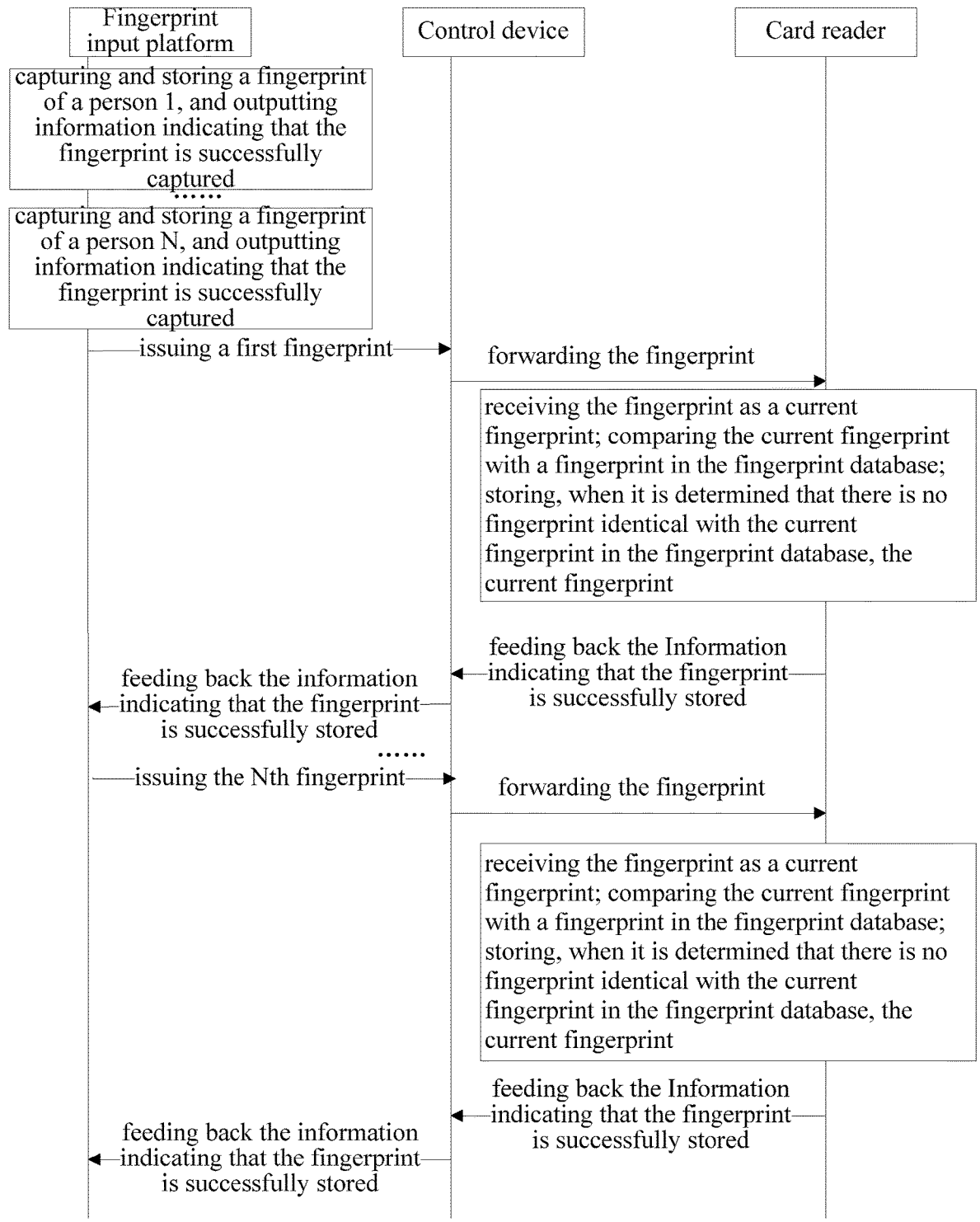
FIG. 10 is a schematic flow diagram of a fingerprint input system shown in FIG. 8.

In another situation, when the fingerprint input method provided by the embodiment of the present application is applied to a reader in a fingerprint input system, as shown in FIG. 10, each time the fingerprint input platform captures one fingerprint of one person, the fingerprint is stored; after the fingerprint input platform successfully captures fingerprints of all persons whose fingerprints need to be captured, the fingerprint input platform issues the captured fingerprints to the reader corresponding to a control device through the control device; the reader receives the fingerprint as a current fingerprint, compares the current fingerprint with a fingerprint stored in the fingerprint database, stores, when it is determined that there is no fingerprint identical with the current fingerprint in the fingerprint database, the current fingerprint in the fingerprint database, and feeds back information, which indicates that the current fingerprint is successfully stored, to the fingerprint input platform through the control device. After the fingerprint input platform obtains the information indicating that the current fingerprint is successfully stored, the fingerprint input platform issues a next fingerprint for the current fingerprint to a reader corresponding to a control device through the control device; the reader receives the fingerprint as the current fingerprint, and continues to perform the step of comparing the current fingerprint with a fingerprint stored in the fingerprint database, until the above fingerprint input platform issues completely all the fingerprints that need to be issued. Wherein, "N" shown in FIG. 10 is a positive integer.

Figure 11:
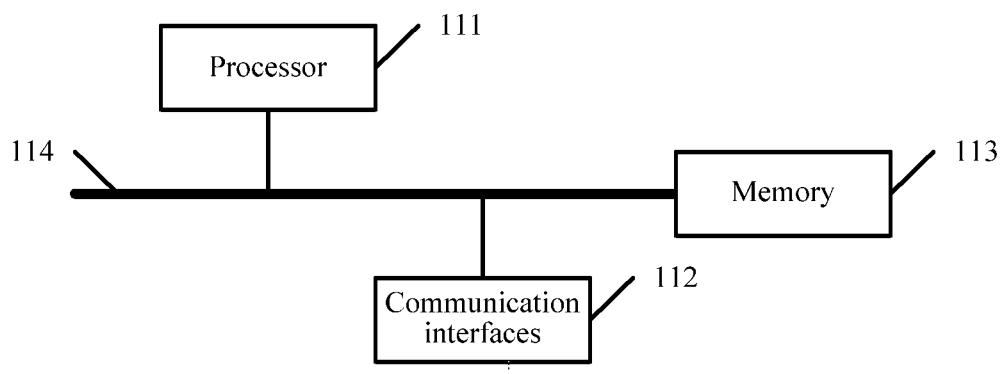
FIG. 11 is a schematic structural diagram of an electronic device provided by an embodiment of the present application.

Corresponding to the above embodiment of the method, an embodiment of the present application further provides an electronic device, as shown in FIG. 11, which includes a processor 111, a communication interface 112, a memory 113 and a communication bus 114; wherein the processor 111, the communication interface 112 and the memory 113 communicate with each other via the communication bus 114;

the memory 113 is configured for storing a computer program;

the processor 111 is configured for, when executing the computer program stored in the memory 113, implementing any fingerprint input method provided by the embodiment of the present application, and the method may include the steps of:

obtaining a fingerprint as a current fingerprint;

comparing the current fingerprint with a fingerprint stored in a fingerprint database;

storing, when it is determined that there is no fingerprint identical with the current fingerprint in the fingerprint database, the current fingerprint in the fingerprint database.

In the embodiment of the present application, a fingerprint is obtained as a current fingerprint; the current fingerprint is compared with a fingerprint stored in a fingerprint database; when it is determined that there is no fingerprint identical with the current fingerprint in the fingerprint database, the current fingerprint is stored in the fingerprint database. It can be seen that in the embodiment of the present application, before storing the obtained current fingerprint in the fingerprint database, it is firstly determined whether there is a fingerprint identical with the current fingerprint in the fingerprint database, and when it is determined that there is no fingerprint identical with the current fingerprint in the fingerprint database, the current fingerprint is stored in the fingerprint database, to avoid existence of duplicate fingerprints in the fingerprint database, avoid the input of the duplicate fingerprints, avoid occurrence of the situation that different person IDs correspond to the same fingerprint, and improve the user experience.

In one implementation, after storing the current fingerprint in the fingerprint database, the method further includes:

obtaining a person identity corresponding to the current fingerprint as a current person identity;

storing the current person identity in correspondence with the current fingerprint in the fingerprint database.

In one implementation, the fingerprint database further stores correspondences between fingerprints and person identities; the method further includes:

determining, when it is determined that there is a fingerprint identical with the current fingerprint in the fingerprint database, a person identity corresponding to the fingerprint identical with the current fingerprint in the fingerprint database as a comparison person identity;

obtaining a person identity corresponding to the current fingerprint as a current person identity;

comparing the current person identity with the comparison person identity;

discarding, when it is determined that the current person identity is the same as the comparison person identity, the current person identity and the current fingerprint.

In one implementation, each of the correspondences between the fingerprints and the person identities stored in the fingerprint database is a one-to-one relationship or a many-to-one relationship.

In one implementation, the electronic device is a reader, and after discarding the current person identity and the current fingerprint, the method further includes:

feeding back information, which indicates that the fingerprint is successfully stored, to a fingerprint input platform, so that the fingerprint input platform sends a next fingerprint for the current fingerprint to the reader.

In one implementation, the electronic device is a reader, and the method further includes:

determining, when it is determined that the current person identity is different from the comparison person identity, that the current person identity and the comparison person identity correspond to the same fingerprint, and recording the current person identity and the comparison person identity.

In one implementation, after recording the current person identity and the comparison person identity, the method further includes:

sending the recorded current person identity and comparison person identity to a fingerprint input platform;

so that the fingerprint input platform outputs first prompt information containing the current person identity and the comparison person identity, to prompt a fingerprint input person to re-capture and store a fingerprint corresponding to the current person identity and a fingerprint corresponding to the comparison person identity.

In one implementation, the electronic device is a reader, and obtaining a fingerprint as a current fingerprint includes:

obtaining a fingerprint sent by the fingerprint input platform as the current fingerprint.

In one implementation, the electronic device is a fingerprint input platform, and after discarding the current person identity and the current fingerprint, the method further includes:

outputting second prompt information to prompt a fingerprint input person that the current fingerprint and the current person identity are successfully stored.

In one implementation, the electronic device is a fingerprint input platform, and the method further includes:

storing, when it is determined that the current person identity is different from the comparison person identity, the current fingerprint and the current person identity in the fingerprint database, and recording a correspondence between the current fingerprint and the current person identity;

determining the comparison person identity;

outputting third prompt information containing the comparison person identity, to prompt a fingerprint input person to re-input a fingerprint corresponding to the comparison person identity.

In one implementation, after outputting third prompt information containing the comparison person identity, the method further includes:

receiving the fingerprint, corresponding to the comparison person identity, captured by a fingerprint module;

replacing the locally stored fingerprint corresponding to the comparison person identity with the received fingerprint corresponding to the comparison person identity.

In one implementation, after storing the current fingerprint in the fingerprint database, the method further includes:

sending, when receiving a fingerprint issuing instruction, a fingerprint, corresponding to the fingerprint issuing instruction, stored in the fingerprint database to at least one reader corresponding to a control device through the control device, so that the at least one reader receives and stores the sent fingerprint corresponding to the fingerprint issuing instruction.

In one implementation, the electronic device is a fingerprint input platform, and obtaining a fingerprint as a current fingerprint includes:

obtaining a fingerprint captured by a fingerprint module as the current fingerprint.

In one implementation, the electronic device may be a fingerprint input platform in the fingerprint input system, and in another implementation, the electronic device may be a reader in the fingerprint input system.

The communication bus in the electronic device may be a peripheral component interconnect (PCI) bus or an extended industry standard architecture (EISA) bus and the like. The communication bus can include an address bus, a data bus, a control bus, or the like. For representation, only one thick line is shown in the figure, which does not mean there is only one communication bus or one type of communication bus.

The communication interface is configured for communication between the above electronic device and other devices.

The memory may include a random access memory (RAM), or may include a non-volatile memory (NVM), for example at least one disk memory. Optionally, the memory may also be at least one storage apparatus located away from the processor described above.

The above processor may be a general-purpose processor, including a central processing unit (CPU), a network processor (NP), or the like; the processor may also be a digital signal processor (DSP), an application specific integrated circuit (ASIC), a field-programmable gate array (FPGA) or other programmable logic equipment, a discrete gate or transistor logic equipment, a discrete hardware component.

Corresponding to the above embodiment of the method, an embodiment of the present application further provides a computer readable storage medium; wherein the computer readable storage medium stores a computer program therein, and the computer program, when executed by a processor, implements any fingerprint input method provided by the embodiment of the present application. The method may include the steps of:

obtaining a fingerprint as a current fingerprint; comparing the current fingerprint with a fingerprint stored in a fingerprint database; storing, when it is determined that there is no fingerprint identical with the current fingerprint in the fingerprint database, the current fingerprint in the fingerprint database.

In the embodiment of the present application, a fingerprint is obtained as a current fingerprint; the current fingerprint is compared with a fingerprint stored in a fingerprint database; when it is determined that there is no fingerprint identical with the current fingerprint in the fingerprint database, the current fingerprint is stored in the fingerprint database. It can be seen that in the embodiment of the present application, before storing the obtained current fingerprint in the fingerprint database, it is firstly determined whether there is a fingerprint identical with the current fingerprint in the fingerprint database, and when it is determined that there is no fingerprint identical with the current fingerprint in the fingerprint database, the current fingerprint is stored in the fingerprint database, to avoid existence of duplicate fingerprints in the fingerprint database, avoid the input of the duplicate fingerprints, avoid occurrence of the situation that different person IDs correspond to the same fingerprint, and improve the user experience.

In one implementation, after storing the current fingerprint in the fingerprint database, the method further includes:

obtaining a person identity corresponding to the current fingerprint as a current person identity;

storing the current person identity in correspondence with the current fingerprint in the fingerprint database.

In one implementation, the fingerprint database further stores correspondences between fingerprints and person identities, and the method further includes:

determining, when it is determined that there is a fingerprint identical with the current fingerprint in the fingerprint database, a person identity corresponding to the fingerprint identical with the current fingerprint in the fingerprint database as a comparison person identity;

obtaining a person identity corresponding to the current fingerprint as a current person identity;

comparing the current person identity with the comparison person identity;

discarding, when it is determined that the current person identity is the same as the comparison person identity, the current person identity and the current fingerprint.

In one implementation, each of the correspondences between the fingerprints and the person identities stored in the fingerprint database is a one-to-one relationship or a many-to-one relationship.

In one implementation, the method is applied to a reader, and after discarding the current person identity and the current fingerprint, the method further includes:

feeding back information, which indicates that the fingerprint is successfully stored, to a fingerprint input platform, so that the fingerprint input platform sends a next fingerprint for the current fingerprint to the reader.

In one implementation, the method is applied to a reader, and the method further includes:

determining, when it is determined that the current person identity is different from the comparison person identity, that the current person identity and the comparison person identity correspond to the same fingerprint, and recording the current person identity and the comparison person identity.

In one implementation, after recording the current person identity and the comparison person identity, the method further includes:

sending the recorded current person identity and comparison person identity to a fingerprint input platform;

so that the fingerprint input platform outputs first prompt information containing the current person identity and the comparison person identity, to prompt a fingerprint input person to re-capture and store a fingerprint corresponding to the current person identity and a fingerprint corresponding to the comparison person identity.

In one implementation, the method is applied to a reader, and obtaining a fingerprint as a current fingerprint includes:

obtaining a fingerprint sent by the fingerprint input platform as the current fingerprint.

In one implementation, the method is applied to a fingerprint input platform, and after discarding the current person identity and the current fingerprint, the method further includes:

outputting second prompt information to prompt a fingerprint input person that the current fingerprint and the current person identity are successfully stored.

In one implementation, the method is applied to a fingerprint input platform, and the method further includes:

storing, when it is determined that the current person identity is different from the comparison person identity, the current fingerprint and the current person identity in the fingerprint database, and recording a correspondence between the current fingerprint and the current person identity;

determining the comparison person identity;

outputting third prompt information containing the comparison person identity, to prompt a fingerprint input person to re-input a fingerprint corresponding to the comparison person identity.

In one implementation, after outputting third prompt information containing the comparison person identity, the method further includes:

receiving the fingerprint, corresponding to the comparison person identity, captured by a fingerprint module;

replacing the locally stored fingerprint corresponding to the comparison person identity with the received fingerprint corresponding to the comparison person identity.

In one implementation, after storing the current fingerprint in the fingerprint database, the method further includes:

sending, when receiving a fingerprint issuing instruction, a fingerprint, corresponding to the fingerprint issuing instruction, stored in the fingerprint database to at least one reader corresponding to a control device through the control device, so that the at least one reader receives and stores the sent fingerprint corresponding to the fingerprint issuing instruction.

In one implementation, the method is applied to a fingerprint input platform, and obtaining a fingerprint as a current fingerprint includes:

obtaining a fingerprint captured by a fingerprint module as the current fingerprint.

Corresponding to the above embodiment of method, an embodiment of the present application provides a computer program product; the computer program product, when executed by a computer, causes the computer to execute any fingerprint input method steps in the above embodiment.

In the embodiment of the present application, a fingerprint is obtained as a current fingerprint; the current fingerprint is compared with a fingerprint stored in a fingerprint database; when it is determined that there is no fingerprint identical with the current fingerprint in the fingerprint database, the current fingerprint is stored in the fingerprint database. It can be seen that in the embodiment of the present application, before storing the obtained current fingerprint in the fingerprint database, it is firstly determined whether there is a fingerprint identical with the current fingerprint in the fingerprint database, and when it is determined that there is no fingerprint identical with the current fingerprint in the fingerprint database, the current fingerprint is stored in the fingerprint database, to avoid existence of duplicate fingerprints in the fingerprint database, avoid the input of the duplicate fingerprints, avoid occurrence of the situation that different person IDs correspond to the same fingerprint, and improve the user experience.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles or devices. Without further limitations, elements defined by the sentences "comprise(s) a/an . . . " or "include(s) a/an . . . " do not exclude that there are additional identical elements in the processes, methods, articles, or devices which include the listed elements.

All of the embodiments in the description are described in a correlated manner, and identical or similar parts in various embodiments can refer to one another. In addition, the description for each embodiment focuses on the differences from other embodiments. In particular, the embodiment apparatus is described briefly, since it is basically similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A fingerprint input method, comprising:
obtaining a fingerprint as a current fingerprint;
comparing the current fingerprint with a fingerprint stored in a fingerprint database;
wherein the fingerprint database further stores correspondences between fingerprints and person identities;

storing, when it is determined that there is no fingerprint identical with the current fingerprint in the fingerprint database, the current fingerprint in the fingerprint database;

determining, when it is determined that there is a fingerprint identical with the current fingerprint in the fingerprint database, a person identity corresponding to the fingerprint identical with the current fingerprint in the fingerprint database as a comparison person identity;

obtaining a person identity corresponding to the current fingerprint as a current person identity;

comparing the current person identity with the comparison person identity; and discarding, when it is determined that the current person identity is the same as the comparison person identity, the current person identity and the current fingerprint.

2. The method of claim 1, wherein after the step of storing the current fingerprint in the fingerprint database, the method further comprises:

obtaining a person identity corresponding to the current fingerprint as a current person identity;

storing the current person identity in correspondence with the current fingerprint in the fingerprint database; or wherein the method is applied to a fingerprint input platform, and after the step of storing the current fingerprint in the fingerprint database, the method further comprises:

sending, when receiving a fingerprint issuing instruction, a fingerprint, corresponding to the fingerprint issuing instruction, stored in the fingerprint database to at least one reader corresponding to a control device through the control device, so that the at least one reader receives and stores the sent fingerprint corresponding to the fingerprint issuing instruction.

3. The method of claim 1, wherein the method is applied to a reader, and the method further comprises:

when it is determined that the current person identity is different from the comparison person identity, recording the current person identity and the comparison person identity; or wherein the method is applied to a fingerprint input platform, and the method further comprises:

storing, when it is determined that the current person identity is different from the comparison person identity, the current fingerprint and the current person identity in the fingerprint database, and recording a correspondence between the current fingerprint and the current person identity;

outputting third prompt information containing the comparison person identity, to prompt to re-input a fingerprint corresponding to the comparison person identity.

4. The method of claim 1, wherein each of the correspondences between the fingerprints and the person identities stored in the fingerprint database is a one-to-one relationship or a many-to-one relationship.

5. The method of claim 1, wherein the method is applied to a reader, and after the step of discarding the current person identity and the current fingerprint, the method further comprises:

feeding back information, which indicates that the fingerprint is successfully stored, to a fingerprint input platform, so that the fingerprint input platform sends a next fingerprint for the current fingerprint to the reader; or wherein the method is applied to a fingerprint input platform, and after the step of discarding the current person identity and the current fingerprint, the method further comprises:

outputting second prompt information to prompt that the current fingerprint and the current person identity are successfully stored.

6. The method of claim 3, wherein after the step of recording the current person identity and the comparison person identity, the method further comprises:

sending the recorded current person identity and comparison person identity to a fingerprint input platform;

so that the fingerprint input platform outputs first prompt information containing the current person identity and the comparison person identity, to prompt to re-capture and store a fingerprint corresponding to the current person identity and a fingerprint corresponding to the comparison person identity.

7. The method of claim 1, wherein the method is applied to a reader, and the step of obtaining a fingerprint as a current fingerprint comprises:

obtaining a fingerprint sent by the fingerprint input platform as the current fingerprint; or the method is applied to a fingerprint input platform, the step of obtaining a fingerprint as a current fingerprint comprises:

obtaining a fingerprint captured by a fingerprint module as the current fingerprint.

8. The method of claim 3, wherein after the step of outputting third prompt information containing the comparison person identity, the method further comprises:

receiving the fingerprint, corresponding to the comparison person identity, captured by a fingerprint module;

replacing the locally stored fingerprint corresponding to the comparison person identity with the received fingerprint corresponding to the comparison person identity.

9. A fingerprint input system, wherein the fingerprint input system comprises: a fingerprint input platform, a control device and a reader; the fingerprint input platform is connected with a reader corresponding to a control device through the control device;

the fingerprint input platform is configured for obtaining a fingerprint captured by a fingerprint module as a current fingerprint; comparing the current fingerprint with a fingerprint stored in a fingerprint database; wherein the fingerprint database further stores correspondences between fingerprints and person identities; storing, when it is determined that there is no fingerprint identical with the current fingerprint in the fingerprint database, the current fingerprint in the fingerprint database; sending the fingerprint stored in the fingerprint database to the control device; determining, when it is determined that there is a fingerprint identical with the current fingerprint in the fingerprint database, a person identity corresponding to the fingerprint identical with the current fingerprint in the fingerprint database as a comparison person identity; obtaining a person identity corresponding to the current fingerprint as a current person identity; comparing the current person identity with the comparison person identity; and, discarding, when it is determined that the current person identity is the same as the comparison person identity, the current person identity and the current fingerprint;

the control device is configured for receiving the fingerprint sent by the fingerprint input platform and sending the received fingerprint to the corresponding reader;

the reader is configured for receiving and storing the fingerprint sent by the corresponding control device.

10. The system of claim 9, wherein the fingerprint input platform is further configured for obtaining, after storing the current fingerprint in the fingerprint database, a person identity corresponding to the current fingerprint as a current person identity, and storing the current person identity in correspondence with the current fingerprint in the fingerprint database; or wherein the fingerprint input platform is further configured for sending, when receiving a fingerprint issuing instruction, a fingerprint, corresponding to the fingerprint issuing instruction, stored in the fingerprint database to at least one reader corresponding to a control device through the control device after storing the current fingerprint in the fingerprint database, so that the at least one reader receives and stores the sent fingerprint corresponding to the fingerprint issuing instruction; or wherein the fingerprint input platform is specifically configured for obtaining a fingerprint captured by a fingerprint module as the current fingerprint.

11. The system of claim 9, wherein the fingerprint input platform is further configured for: storing, when it is determined that the current person identity is different from the comparison person identity, the current fingerprint and the current person identity in the fingerprint database, and recording a correspondence between the current fingerprint and the current person identity;

outputting third prompt information containing the comparison person identity, to prompt to re-input a fingerprint corresponding to the comparison person identity.

12. The system of claim 11, wherein the fingerprint input platform is further configured for: receiving the fingerprint, corresponding to the comparison person identity, captured by a fingerprint module after outputting the third prompt information containing the comparison person identity;

replacing the locally stored fingerprint corresponding to the comparison person identity with the received fingerprint corresponding to the comparison person identity.

13. A fingerprint input system, wherein the fingerprint input system comprises: a fingerprint input platform, a control device and a reader; the fingerprint input platform is connected with a reader corresponding to a control device through the control device;

the fingerprint input platform is configured for obtaining and storing a fingerprint, and sending the stored fingerprint to the control device;

the control device is configured for receiving the fingerprint sent by the fingerprint input platform and sending the received fingerprint to the corresponding reader;

the reader is configured for using, each time receiving one fingerprint sent by the corresponding control device, the fingerprint as a current fingerprint; comparing the current fingerprint with a fingerprint stored in a fingerprint database; wherein the fingerprint database further stores correspondences between fingerprints and person identities; storing, when it is determined that there is no fingerprint identical with the current fingerprint in the fingerprint database, the current fingerprint in the fingerprint database; determining, when it is determined that there is a fingerprint identical with the current fingerprint in the fingerprint database, a person identity corresponding to the fingerprint identical with the current fingerprint in the fingerprint database as a comparison person identity; obtaining a person identity corresponding to the current fingerprint as a current person identity; comparing the current person identity with the comparison person identity; and, discarding, when it is determined that the current person identity is the same as the comparison person identity, the current person identity and the current fingerprint.

14. The system of claim 13, wherein the fingerprint input platform is further configured for obtaining and storing a person identity corresponding to each fingerprint, and sending the stored person identity corresponding to each fingerprint to the control device;

the control device is further configured for receiving the person identity, corresponding to each fingerprint, sent by the fingerprint input platform and sending the received person identity, corresponding to each fingerprint, to the corresponding reader;

the reader is further configured for obtaining, after storing the current fingerprint in the fingerprint database, a person identity corresponding to the current fingerprint as a current person identity, and storing the current person identity in correspondence with the current fingerprint in the fingerprint database; or wherein the reader is specifically configured for obtaining a fingerprint sent by the fingerprint input platform as the current fingerprint.

15. The system of claim 13, wherein the reader is further configured for, when it is determined that the current person identity is different from the comparison person identity, recording the current person identity and the comparison person identity.

16. The system of claim 13, wherein the reader is further configured for feeding back information, which indicates that the fingerprint is successfully stored, to a fingerprint input platform after discarding the current person identity and the current fingerprint, so that the fingerprint input platform sends a next fingerprint for the current fingerprint to the reader.

17. The system of claim 15, wherein the reader is further configured for sending the recorded current person identity and comparison person identity to a fingerprint input platform after recording the current person identity and the comparison person identity;

so that the fingerprint input platform outputs first prompt information containing the current person identity and the comparison person identity, to prompt to re-capture and store a fingerprint corresponding to the current person identity and a fingerprint corresponding to the comparison person identity.

18. An electronic device, comprising a processor, and a memory;

the memory is configured for storing a computer program;

the processor is configured for, when executing the computer program stored in the memory, implementing steps of the fingerprint input method of claim 1.

19. A non-transitory computer readable storage medium, wherein the computer readable storage medium stores a computer program therein; the computer program, when executed by a processor, implements steps of the fingerprint input method of claim 1.

20. The system of claim 9, wherein the fingerprint input platform is further configured for:

outputting second prompt information to prompt that the current fingerprint and the current person identity are successfully stored, after discarding the current person identity and the current fingerprint.

\* \* \* \* \*